(12) United States Patent
Potasek et al.

(10) Patent No.: US 11,703,399 B2
(45) Date of Patent: Jul. 18, 2023

(54) SURFACE MOUNT TEMPERATURE MEASUREMENT

(71) Applicant: Rosemount Aerospace Inc., Burnsville, MN (US)

(72) Inventors: David P. Potasek, Lakewood, MN (US); Richard William Phillips, Eagan, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 257 days.

(21) Appl. No.: 17/212,692

(22) Filed: Mar. 25, 2021

(65) Prior Publication Data
US 2022/0307920 A1    Sep. 29, 2022

(51) Int. Cl.
| | | |
|---|---|---|
| *G01K 13/024* | (2021.01) | |
| *G01K 1/02* | (2021.01) | |
| *G01K 7/16* | (2006.01) | |
| *G01K 7/18* | (2006.01) | |
| *G01K 7/02* | (2021.01) | |
| *G01K 7/42* | (2006.01) | |
| *G01K 1/20* | (2006.01) | |
| *G01K 3/14* | (2006.01) | |

(52) U.S. Cl.
CPC ........... *G01K 13/024* (2021.01); *G01K 1/026* (2013.01); *G01K 7/16* (2013.01); *G01K 1/20* (2013.01); *G01K 3/14* (2013.01); *G01K 7/02* (2013.01); *G01K 7/18* (2013.01); *G01K 7/427* (2013.01)

(58) Field of Classification Search
CPC ........ G01K 13/024; G01K 1/026; G01K 7/16; G01K 1/20; G01K 3/14; G01K 7/02; G01K 7/18; G01K 7/427
See application file for complete search history.

(56) References Cited

U.S. PATENT DOCUMENTS

| | | | | |
|---|---|---|---|---|
| 3,139,752 | A * | 7/1964 | Giedt | G01K 7/14 374/134 |
| 3,417,617 | A * | 12/1968 | Rall | G01K 7/02 374/165 |
| 3,592,058 | A * | 7/1971 | Benson | G01P 5/10 73/204.24 |
| 6,672,152 | B2 * | 1/2004 | Rouse | G01P 13/025 73/170.01 |
| 9,702,892 | B1 * | 7/2017 | Richardson | G01P 13/025 |
| 9,846,085 | B2 * | 12/2017 | Newell | G01K 1/14 |
| 10,591,363 | B2 * | 3/2020 | Phillips | G01K 7/021 |

(Continued)

OTHER PUBLICATIONS

Extended European Search Report for EP Application No. 22163304.3, dated Jul. 19, 2022, 9 pages.

*Primary Examiner* — Nathaniel T Woodward
*Assistant Examiner* — Philip L Cotey
(74) *Attorney, Agent, or Firm* — Kinney & Lange, P.A.

(57) ABSTRACT

A temperature sensor assembly for measuring a gas temperature in a gas flow stream includes a first substrate having a first surface configured to be connected to a thermally conductive structure in a gas path, a first temperature sensor mounted to the first substrate a first distance from the first surface, and a second temperature sensor mounted to the first substrate a second distance from the first surface. The second distance is less than the first distance. The first and second temperature sensors are arranged along a temperature gradient.

9 Claims, 4 Drawing Sheets

(56) References Cited

U.S. PATENT DOCUMENTS

| | | | |
|---|---|---|---|
| 2012/0109572 A1* | 5/2012 | Shimizu | G01K 13/20 |
| | | | 702/131 |
| 2017/0074730 A1* | 3/2017 | Rieder | G01K 7/427 |
| 2017/0212065 A1* | 7/2017 | Rud | G01K 7/427 |
| 2019/0293241 A1* | 9/2019 | Rud | G01K 1/16 |
| 2020/0355560 A1* | 11/2020 | Shimizu | G01K 1/20 |

* cited by examiner

SURFACE MOUNT TEMPERATURE MEASUREMENT

BACKGROUND

The present disclosure relates generally to sensor systems and more particularly to temperature sensor systems for measuring temperature in a gas flow path of a gas turbine engine.

Gas temperature is typically measured by placing a temperature sensor into the gas flow path. Typical flush mount or surface mount temperature sensors can provide temperature measurements that are distorted by the temperature of the chassis or casing structure to which they are mounted. To provide accurate measurement, the temperature sensor generally must be thermally isolated from the casing structure to prevent distortion by heat transfer between the sensor and the casing structure. Temperature sensors that protrude into the gas flow path can provide accurate measurements but are susceptible to impact damage and can distort the gas flow stream.

A need exists for surface mount temperature sensors that provide accurate temperature measurements, are less susceptible to impact damage, and do not distort the gas flow stream.

SUMMARY

A temperature sensor assembly for measuring a gas temperature in a gas flow stream includes a first substrate having a first surface configured to be connected to a thermally conductive structure in a gas path, a first temperature sensor mounted to the first substrate a first distance from the first surface, and a second temperature sensor mounted to the first substrate a second distance from the first surface. The second distance is less than the first distance. The first and second temperature sensors are arranged along a temperature gradient.

A method of determining a temperature of a gas in a gas flow path includes providing a first heat transfer path through a first substrate between a first temperature sensor and a thermally conductive structure connected to the first substrate, providing a second heat transfer path through the substrate between a second temperature sensor and the thermally conductive structure, wherein a distance of the second heat transfer path is less than a distance of the first heat transfer path. The first temperature sensor is used to measure a first temperature in a gas flow path. The second temperature sensor is used to measure a second temperature. A processor is used to determine a heat flux along each of the first and second heat transfer paths, a difference in the heat flux between the first and second heat transfer paths, and a temperature of the gas in the gas flow path based on the difference in heat flux.

The present summary is provided only by way of example, and not limitation. Other aspects of the present disclosure will be appreciated in view of the entirety of the present disclosure, including the entire text, claims and accompanying figures.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

The present disclosure is directed to surface mount temperature sensor assemblies that can be used to accurately measure a temperature of a gas flow stream without distorting flow in the gas flow stream. The disclosed surface mount temperature sensor assemblies are particularly suited to measuring temperatures in a gas flow path of a gas turbine engine. The disclosed surface mount temperature sensor assemblies can be used to measure gas temperatures in one or more locations of a gas flow path. For example, the disclosed surface mount temperature assemblies can be used to measure gas temperatures at differing turbine stages of a gas turbine engine. Although the disclosed assemblies have been developed for use in a gas turbine engine, it will be understood by one of ordinary skill in the art that the structures and approaches described herein are not limited to use with gas turbine engines. The disclosed surface mount temperature sensor assemblies can be used to measure air or gas temperatures in a variety of applications. Furthermore, it will be understood by one of ordinary skill in the art that the present disclosure is not limited to the particular embodiments described herein and that the teachings can be applied to develop a variety of surface mount temperature sensor assemblies.

The disclosed surface mount temperature sensor assemblies are designed to create a heat flux through a known conductive medium, which can be used to calculate a temperature of the gas flow stream. Each of the disclosed embodiments requires at least two conductive heat transfer paths between a temperature sensor and chassis or structure to which the temperature sensor assembly is mounted in a gas flow path. The heat transfer paths are formed through a material having a known thermal conductivity and capable of creating a thermal gradient between two temperature sensors. The temperature of the gas flow stream can be calculated by determining the amount of heat transferred through the thermally conductive material, which depends on the local temperature at the sensor and properties of the gas flow stream. The disclosed temperature sensor arrangements and materials can be modified according to the teachings herein. The scope of the present disclosure extends to surface mount temperature sensor assemblies having different temperature sensor arrangements or different materials but designed to operate according to principles disclosed herein.

Figure 1:
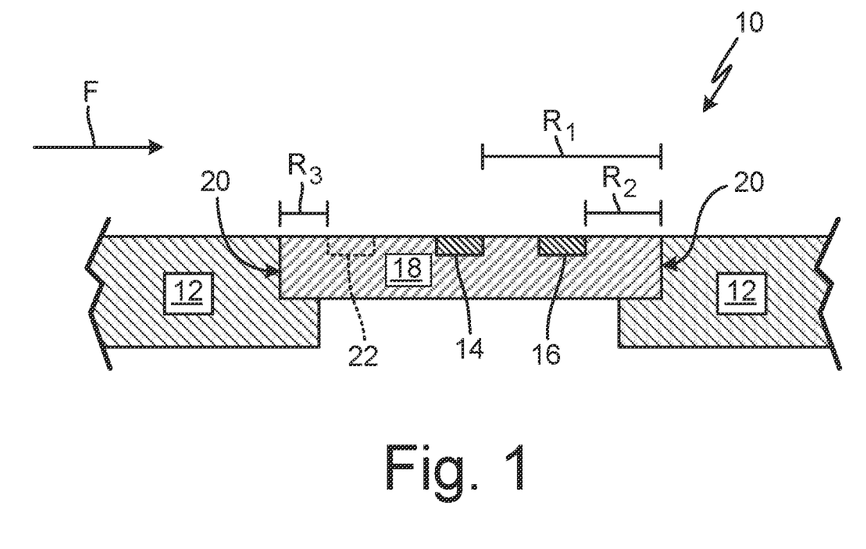
FIG. 1 is a simplified cross-sectional view of one embodiment of a temperature sensor assembly mounted to a structure in a gas flow path.

FIG. 1 is a simplified cross-sectional view of temperature sensor assembly 10 disposed in a gas path to measure a temperature of gas in a gas flow stream. FIG. 1 shows temperature sensor assembly 10 and chassis 12. Temperature sensor assembly 10 includes temperature sensors 14 and 16, substrate 18, and mounting surface 20. Temperature sensor assembly 10 is mounted to chassis 12 to position temperature sensors 14 and 16 adjacent to a gas flow path to measure a temperature of gas stream F. As described further here, temperature sensor assembly 10 can optionally include additional temperature sensors such as temperature sensor 22 (shown in phantom).

Chassis 12 is a structure in the gas flow path that anchors temperature sensor assembly 10. Chassis 12 can be any structure, such as a support structure or casing to which temperature sensor assembly 10 is mounted. Temperature sensor assembly 10 and chassis 12 together can define a portion of a gas flow path boundary. For example, as illustrated in FIG. 1, temperature sensor assembly 10 can be positioned in a gap between adjacent chassis walls such that both temperature sensor assembly 10 and chassis 12 are disposed in line with gas flow F. Chassis 12 is formed of a thermally conductive material. Chassis 12 is typically formed of a metal, such as stainless steel, and has a relatively high thermal conductivity relative to substrate 18.

Temperature sensor assembly 10 includes temperature sensors 14 and 16, substrate 18, and mounting surfaces 20. Temperature sensors 14 and 16 are disposed on an outer surface of substrate 18 exposed to the gas flow path. Mounting surfaces 20 can be a surface of substrate 18 or can be one or more mounting structures (not shown) connected to one or more surfaces of substrate 18 to provide a means for attaching temperature assembly 10 to chassis 12. A mounting structure can be formed from the same material as chassis 12 or other material having a thermal conductivity that provides for heat transfer between chassis 12 and temperature sensors 14 and 16. A mounting structure can have a thermal conductivity greater than substrate 18. As described further herein, temperature sensors 14 and 16 can be flush mounted in temperature sensor assembly 10 such that temperature sensors 14 and 16 minimally protrude into the gas path and do not disrupt the gas flow. Temperature sensors 14 and 16 can be installed such that a sensing area of temperature sensors 14 and 16 and a chassis surface (wall defining gas flow path) are coplanar within manufacturing tolerances (i.e., less than 0.1 inches (0.254 cm) protrusion into gas flow path). Temperature sensors 14 and 16 are arranged in generally close proximity or at locations in the gas path where the temperature of the gas flow stream is the same, such that any differences in temperatures sensed by temperature sensor 14 and 16 are attributable to conductive heat transfer through substrate 18 and not differences in gas flow properties (i.e., temperature and velocity).

Temperature sensors 14 and 16 can be resistive temperature detectors (RTD), differential thermocouple devices, or combinations thereof, as described in U.S. Pat. No. 10,591,363, configured to generate a sensing signal indicative of a temperature. In some embodiments, temperature sensors 14 and 16 can be thin film RTDs disposed on an outer surface of substrate 18 and protected by a thin film passivation layer as described in further detail below.

Substrate 18 is a thermally conductive material capable of providing a heat transfer path between temperature sensors 14 and 16 and chassis 12. Substrate 18 is formed of a material having a thermal conductivity and area to provide a known thermal resistance in heat transfer between temperature sensors 14 and 16 and chassis 12. During operation, a temperature of chassis 12 can be greater or less than a temperature of gas flow stream F. Conductive heat transfer paths between chassis 12 and temperature sensors 14 and 16 allow heat to be transferred to or from temperature sensors 14 and 16 thereby distorting a temperature sensed by temperature sensors 14 and 16. Absent substrate 18, chassis 12 would equally distort a sensed temperature of all temperature sensors 14, 16 disposed in contact with chassis 12. Substrate 18 is provided to produce heat transfer paths between temperature sensor 14 and chassis 12 and between temperature sensor 16 and chassis 12 that differ in length to increase or decrease the heat transfer between each of temperature sensors 14 and 16 and chassis 12 and thereby provide a temperature gradient between temperature sensors 14 and 16, which results in a difference in sensed temperatures.

The material of substrate 18 can be selected to provide a temperature gradient or temperature difference that is detectable by temperature sensors 14 and 16. In some embodiments, a temperature difference of at least one-tenth of a degree Celsius can be detected and is sufficient to determine the amount of sensed temperature distortion attributable to conductive heat flow through substrate 18. Accuracy can be improved by increasing the temperature gradient or difference in temperatures sensed at temperature sensors 14 and 16. In some embodiments, substrate 18 can be a ceramic or silicon material. Other materials may be suitable depending on operational parameters, such as gas flow stream temperature and thermal conductivity of chassis 12.

One or more mounting structures (not shown) can be configured to fasten temperature sensor assembly 10 to chassis 12. Mounting structures can be attached to substrate 18 on one or more sides (i.e., mounting surfaces 20) and can be configured any means known in the art to securely fasten temperature sensor assembly 10 in a location in the gas path. In some embodiments, mounting structures can be formed of the same material as chassis 12 and assembled in direct connection with chassis 12 to provide a uniform thermal conductivity. In some embodiments, temperature sensor assembly 10 can be configured to provide a direct connection between substrate 18 and chassis 12 along a region in line with temperature sensors 14 and 16 thereby providing a heat transfer path that is uninterrupted by a mounting structure.

As illustrated in FIG. 1, temperature sensors 14 and 16 are disposed on an outer surface of substrate 18 in thermal communication with the gas path to sense a temperature of the gas in gas flow stream F. Temperature sensor 14 is located a first distance from a wall of chassis 12 (or thermally conductive mounting structure). Temperature sensor 16 is located a second distance from a wall of chassis 12 (or thermally conductive mounting structure) that is less than the first distance thereby providing two conductive heat transfer paths of differing lengths. The first and second distances are measured from the chassis wall that is closes to each temperature sensor. Although illustrated as being disposed in line (e.g., direction of gas flow F), temperature sensors 14 and 16 can be offset in other embodiments. During operation, heat transfer between temperature sensor 16 and chassis 12 will be greater than heat transfer between temperature sensor 14 and chassis 12 due to the reduced heat transfer path distance and thereby reduced resistance in heat transfer between temperature sensor 16 and chassis 12. $R_1$ represents the thermal resistance between temperature sensor 14 and chassis 12. $R_2$ represents the thermal resistance between temperature sensor 16 and chassis 12.

Temperature sensors 14 and 16 are positioned to be disposed in a portion of the gas path where the gas temperature and properties will be the same, such that the actual temperature of the gas in the gas flow stream F at temperature sensor 14 is equal to the temperature of the gas in the gas flow stream F at temperature sensor 16. However, due to differences in heat transfer through substrate 18, the sensed temperature of the gas in the gas flow stream F at temperature sensors 14 and 16 will be different. The spatial location of temperature sensors 14 and 16 can be selected to increase a thermal gradient between temperature sensors 14 and 16 to improve the ability to detect differences in sensed temperatures at temperature sensors 14 and 16.

Heat flux between temperature sensors 14 and 16 can be determined through conjugate heat transfer analysis. Multi-directional heat flow through all surfaces can be modeled and used to determine a processing algorithm for extracting out the gas flow temperature from sensed temperatures and a determined heat flux.

For a unidirectional heat flow, heat flux is equal to the conductive heat flow, which is equal to the convective heat flow as provided by the equation:

$$\frac{q}{A} = \frac{(T_1 - T_2)k}{\Delta x} = (T_f - T_1)h$$

where q/A is heat transfer rate per unit area (heat flux);

$T_1$ and $T_2$ are sensed temperatures at temperatures sensors 14 and 16, respectively;

$T_f$ is the calculated temperature of the gas in the gas flow stream F;

k is the thermal conductivity of substrate 18;

ΔX is the distance between temperature sensors 14 and 16; and h is the convective heat transfer coefficient related to gas flow.

$T_1$, $T_2$, k, and ΔX are known. h can be correlated to other available gas flow data parameters or can be derived from an additional heat balance equation, enabling the calculation of $T_f$.

For example, an additional heat balance equation can be provided with the incorporation of temperature sensor 22. Temperature sensor 22 can provide a sensed temperature $T_3$ and can be used with temperature sensor 14 to provide a second conductive heat flow equation. The convective heat transfer coefficient h is the same at each of the locations of temperature sensors 14, 16, and 22, and thus can be replaced by the second heat balance equation to solve for $T_f$ as provided below. ΔX1 is the distance between temperature sensors 14 and 16. ΔX2 can be the distance between temperature sensors 22 and 14 or 22 and 16. The value for k (thermal conductivity) is the same in both heat balance equations because temperature sensors 14, 16, and 22 are all located in substrate 18. As discussed further below, in some embodiments temperature sensor assemblies can include different substrate materials, such that the value of k, while known, is different.

$$\frac{(T_1 - T_2)k/\Delta X1}{(T_f - T_1)} = \frac{(T_1 - T_3)k/\Delta X2}{(T_f - T_1)}$$

It will be understood by one of ordinary skill in the art that the unidirectional heat flow equations do not account for three-dimensional heat flow and that conjugate heat transfer analysis would be used to accurately determine heat flux between sensors 14 and 16. It will be understood that the unidirectional heat flow equations are intended to show how gas flow temperatures can be accurately determined using a multi-sensor assembly in the simplest form. Algorithms used to account for multi-dimensional heat flow will depend on substrate material, sensor locations, substrate orientation and geometry, gas flow path temperature and flow properties.

Temperature sensor 22 can be positioned in line with temperature sensors 14 and 16 as illustrated in FIG. 1 or can be offset from temperature sensors 14 and 16. Temperature sensor 22 can be located a third distance from chassis 12, which can be greater than, less than, or equal to the distance between temperature sensor 16 and chassis 12. As illustrated in FIG. 1, temperature sensor 22 is positioned forward or upstream of temperature sensor 14 and closer to an upstream chassis wall; whereas temperature sensor 16 is positioned aft or downstream of temperature sensor 14 and closer to a downstream chassis wall. The terms "forward", "aft", "upstream", and "downstream" are in relation to the direction of gas flow stream F. In other embodiments, both temperature sensors 16 and 22 can be positioned downstream of temperature sensor 14 to provide differing amounts of thermal resistance both less than $R_1$ along the heat flow path between temperature sensor 14 and chassis 12. Temperature sensor 22 can serve as a redundant temperature sensor both temperature sensors 22 and 16 are located an equal distance from chassis 12. More accurate calculations may be made by locating temperature sensor 22 at distance from chassis 12 that is different than the distance between temperature sensor 16 and chassis 12. Preferably, both temperature sensors 16 and 22 are located closer to chassis 12 than temperature sensor 14.

Figure 2:
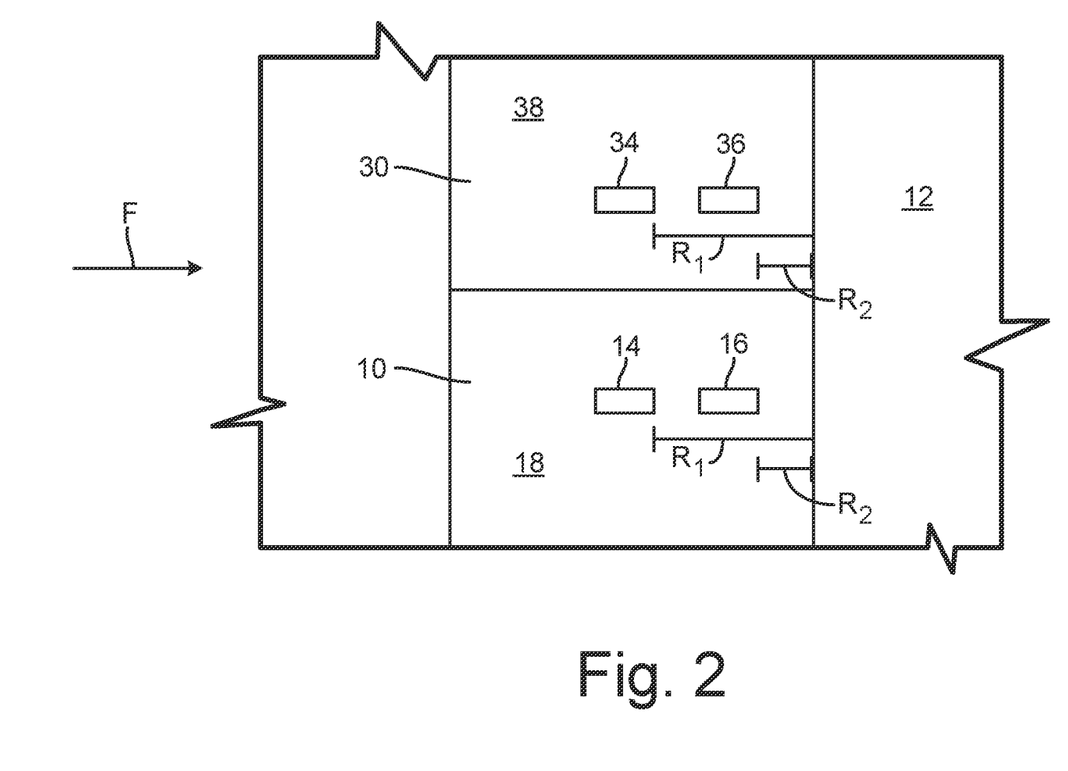
FIG. 2 is a simplified top view of another embodiment of a temperature sensor assembly mounted to a structure in a gas flow path.

In other embodiments, two or more temperature sensor assemblies can be provided in a side-by-side arrangement to improve the accuracy of the $T_f$ calculation. FIG. 2 illustrates a simplified top view of two temperature assemblies 10 and 30 posited in a side-by-side arrangement in the gas path parallel with gas flow stream F. FIG. 2 shows temperature sensor assembly 10 as described with respect to FIG. 1 and temperature sensor assembly 30. Temperature sensor assembly 30 includes temperature sensors 34 and 36 and substrate 38. Temperature sensors 34 and 36 can be the same as temperature sensors 14 and 16 of temperature sensor assembly 10. In some embodiments, temperature sensors 34 and 36 can have the same spatial arrangement as temperature sensors 14 and 16. In other embodiments, temperature sensors 34 and 36 can have spatial arrangements that differ from the spatial arrangements of temperature sensors 14 and 16. Temperature sensors 34 and 36 can be flush mounted as described with respect to temperature sensors 14 and 16. Temperature sensor assembly 30 can be mounted to chassis 12 in the same manner as temperature sensor assembly 10. Temperature sensor assembly 30 can be positioned directly adjacent to temperature sensor assembly 10 or can be spaced from temperature sensor assembly 10. In some embodiments, temperature sensor assembly 13 and temperature sensor assembly 10 can be formed as a unitary structure, which can be mounted to chassis 12.

In some embodiments, substrate 38 can be formed of a material having a different thermal conductivity than the material of substrate 18. Due to differences in thermal conductivity, temperature sensors 34 and 36, having the same spatial arrangement as temperature sensors 14 and 16 and being exposed to the same gas temperature in the gas flow stream F, will sense different temperatures than temperature sensors 14 and 16. The use of temperature sensor assemblies 10 and 30 having substrates of differing thermal conductivity can improve the accuracy of the $T_f$ calculation.

Temperature sensor assembly 30 can include one or more mounting structures as described with respect to temperature sensor assembly 10. In some embodiments, temperature assemblies 10 and 30 can be configured as a unitary temperature sensing assembly that can be mounted as a single unit to chassis 12.

Figure 3:
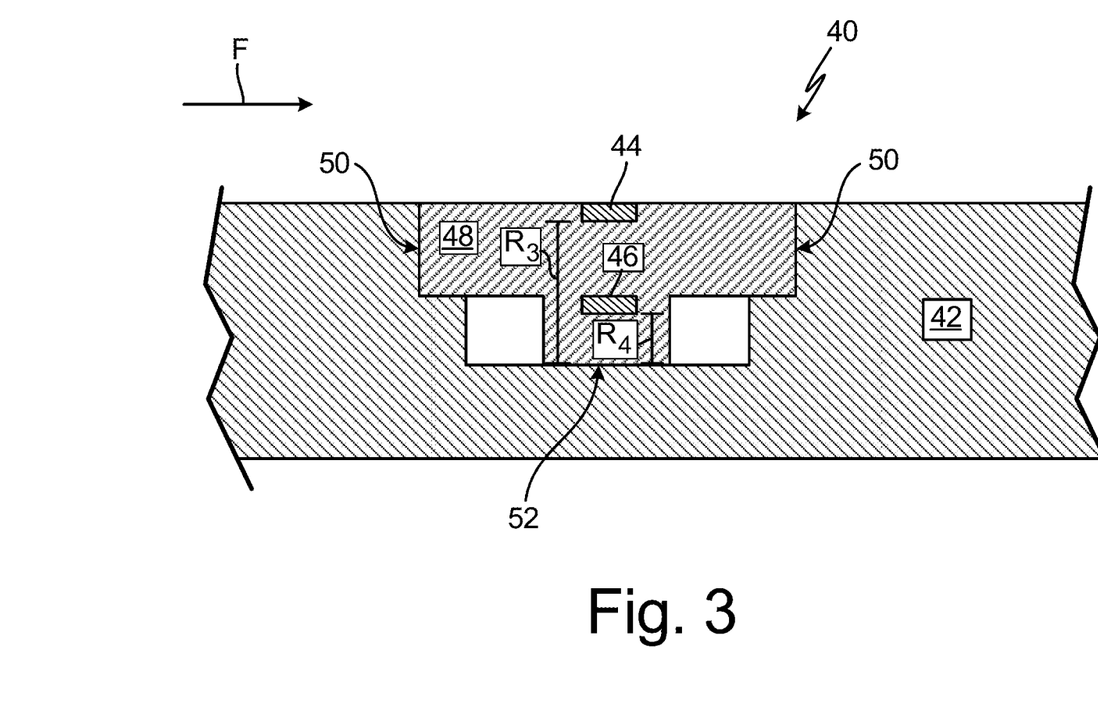
FIG. 3 is a simplified cross-sectional view of a further embodiment of temperature sensor assembly mounted to a structure in a gas flow path.

FIG. 3 is a simplified cross-sectional view of temperature sensor assembly 40 mounted to a structure in a gas flow path. FIG. 3 shows temperature sensor assembly 40 and chassis 42. Temperature sensor assembly 40 includes temperature sensors 44 and 46, substrate 48, and mounting surfaces 50 and 52. Temperature sensor assembly 40 is mounted to chassis 42 to position temperature sensor 44 in a gas flow path to measure a temperature of gas flow stream F.

Chassis 42 is a thermally conductive structure in the gas flow path as described with respect chassis 12 in FIG. 1. Temperature sensor assembly 40 and chassis 42 together can define a portion of a gas flow path boundary. As illustrated in FIG. 3, temperature sensor assembly 40 can be positioned in a gap between adjacent chassis walls such that an outer surface of both temperature sensor assembly 40 and chassis 42 is disposed in line with gas flow F and mounting surfaces 50 are in contact with chassis 12. Additionally, temperature sensor assembly 40 can be disposed in a recessed section of chassis 42, such that an inner mounting surface 52 of temperature sensor assembly 40 opposite the gas flow path is in contact with a recessed wall of chassis 42.

As described with respect to temperature sensor assembly 10, mounting surfaces 50 and 52 can be a surface of substrate 48 or can be one or more mounting structures (not shown) connected to one or more surfaces of substrate 48 to provide a means for attaching temperature assembly 40 to chassis 42. A mounting structure can be formed from the same material as chassis 42 or other material having a thermal conductivity that provides for heat transfer between chassis 42 and temperature sensors 44 and 46. A mounting structure can have a thermal conductivity greater than substrate 48. Mounting structures can be configured any means known in the art to securely fasten temperature sensor assembly 40 in a location in the gas flow path. In some embodiments, mounting surfaces 50 and 52 of temperature sensor assembly 40 can be configured to provide a direct connection between substrate 48 and chassis 42 along a region in line with temperature sensors 44 and 46 thereby providing a heat transfer path that is uninterrupted by a mounting structure.

Temperature sensor assembly 40 includes temperature sensors 44 and 46 and substrate 48. Temperature sensor 44 is disposed on the outer surface of substrate 48. Temperature sensor 46 is disposed inward of the outer surface of substrate 48 between temperature sensor 44 and mounting surface 52 connected to the recessed wall of chassis 42. Substrate 48 can span a gap between adjacent walls of chassis 42 and can be connected thereto via mounting surfaces 50. Substrate 48 can extend inward to the recessed wall of chassis 42 and can be connected thereto via mounting surface 52. Temperature sensor 44 can be flush mounted in temperature sensor assembly 40 such that temperature sensor 44 minimally protrudes into the gas path and does not disrupt the gas flow.

Temperature sensors 44 and 46 can be resistive temperature detectors (RTD), differential thermocouple devices, or combinations thereof as described as described with respect to temperature sensors 14, 16, and 22 of temperature sensor assemblies 10 and 30.

Substrate 48 is a thermally conductive material capable of providing a heat transfer path between temperature sensors 44 and 46 and chassis 42. Substrate 48 is formed of a material having a thermal conductivity and area to provide a known thermal resistance in heat transfer between temperature sensors 44 and 46 and chassis 42 as described with respect to temperature sensor assemblies 10 and 30. Substrate 48 is provided to produce heat transfer paths between temperature sensor 44 and chassis 42 and between temperature sensor 46 and chassis 42 that differ in length to increase or decrease the heat transfer between each of temperature sensors 44 and 46 and chassis 42 and thereby provide a temperature gradient between temperature sensors 44 and 46, which results in a difference in sensed temperatures.

As described with respect to temperature sensor assembly 10, the material of substrate 48 can be selected to provide a temperature gradient or temperature difference that is detectable by temperature sensors 44 and 46. In some embodiments, a temperature difference of at least one-tenth of a degree Celsius can be detected and is sufficient to determine the amount of sensed temperature distortion attributable to conductive heat flow through substrate 48. Accuracy can be improved by increasing the temperature gradient or difference in temperatures sensed at temperature sensors 44 and 46. In some embodiments, substrate 48 can be a ceramic or silicon material. Other materials may be suitable depending on operational parameters, such as gas flow stream temperature and thermal conductivity of chassis 42.

As illustrated in FIG. 3, temperature sensor 44 is disposed on the outer surface of substrate 48 in thermal communication with the gas path to sense a temperature of the gas in gas flow stream F. Temperature sensor 44 is located a first distance from the recessed wall of chassis 42 or mounting surface 52. Temperature sensor 46 is located inward of temperature sensor 44 a second distance from the recessed wall of chassis 42 or mounting surface 52 that is less than the first distance thereby providing two conductive heat transfer paths of differing lengths. Although illustrated as being disposed in line orthogonally from the outer surface of substrate 48, temperature sensors 44 and 46 can be offset in other embodiments. During operation, heat transfer between temperature sensor 46 and chassis 42 will be greater than heat transfer between temperature sensor 44 and chassis 42 due to the reduced heat transfer path distance and thereby reduced resistance in heat transfer between temperature sensor 46 and chassis 42. $R_3$ represents the thermal resistance between temperature sensor 44 and chassis 42. $R_4$ represents the thermal resistance between temperature sensor 46 and chassis 42.

In simplest form, the temperature of the gas flow stream F can be calculated using the equation for unidirectional heat flow as described with respect to use of temperature sensor assembly 10. For a unidirectional heat flow, heat flux is equal to the conductive heat flow, which is equal to the convective heat flow as provided by the equation:

$$\frac{q}{A} = \frac{(T_1 - T_2)k}{\Delta x} = (T_f - T_1)h$$

As previously described, $T_1$, $T_2$, k, and $\Delta X$ are known and h can be correlated to other available gas flow data parameters or can be derived from an additional heat balance equation, enabling the calculation of $T_f$.

For example, an additional heat balance equation can be provided with the incorporation of a second temperature sensor assembly 40 (not shown) arranged in a side-by-side relationship with temperature sensor assembly 40 as described with respect to FIG. 2 such that two temperature sensor 44 are exposed to the same gas flow stream F and thereby have the same h. The second set of temperature sensors 44 and 46 can provide a sensed temperature $T_3$ and $T_4$ to provide a second conductive heat flow equation. The convective heat transfer coefficient h is the same at each of the locations of temperature sensors 44 and thus can be replaced by the second heat balance equation to solve for $T_f$ as provided below. $T_3$, $T_4$, k, and $\Delta X$ in the second conductive heat flow equation are known. $\Delta X$ and k can be the same if the second temperature assembly is a duplicate of temperature assembly 40. As discussed further below, in other embodiments, the second temperature assembly can have a different substrate material and/or different locations of temperature sensors.

$$\frac{(T_1 - T_2)k/\Delta X}{(T_f - T_1)} = \frac{(T_3 - T_4)k/\Delta X}{(T_f - T_3)}$$

In some embodiments, a second temperature sensor (e.g., temperature sensor 22) can be disposed on the outer surface of substrate 48 to provide a second conductive heat flow equation as described with respect to FIG. 1. In some embodiments, temperature sensor assembly 40 can be combined with one or more temperature assemblies 10 or 30. In some embodiments temperature sensor assembly 40 can be combined with a second temperature assembly having a similar configuration to temperature assembly 40 but with a different substrate material as described with respect to FIG. 2.

As discussed with respect to FIG. 1, heat flux between temperature sensors can be determined through conjugate heat transfer analysis. Multi-directional heat flow through all surfaces can be modeled and used to determine a processing algorithm for extracting out the gas flow temperature from sensed temperatures and a determined heat flux.

Two or more temperature sensor assemblies 10, 30, and 40, and modifications thereof as described herein, can provided in any combination to enable an accurate determination of temperature $T_f$ of gas flow stream F. Two or more temperature assemblies 10, 30, and 40, and modifications thereof as described, can be formed as a unitary temperature sensor assembly that can be mounted in chassis 12 or 42.

Figure 4:
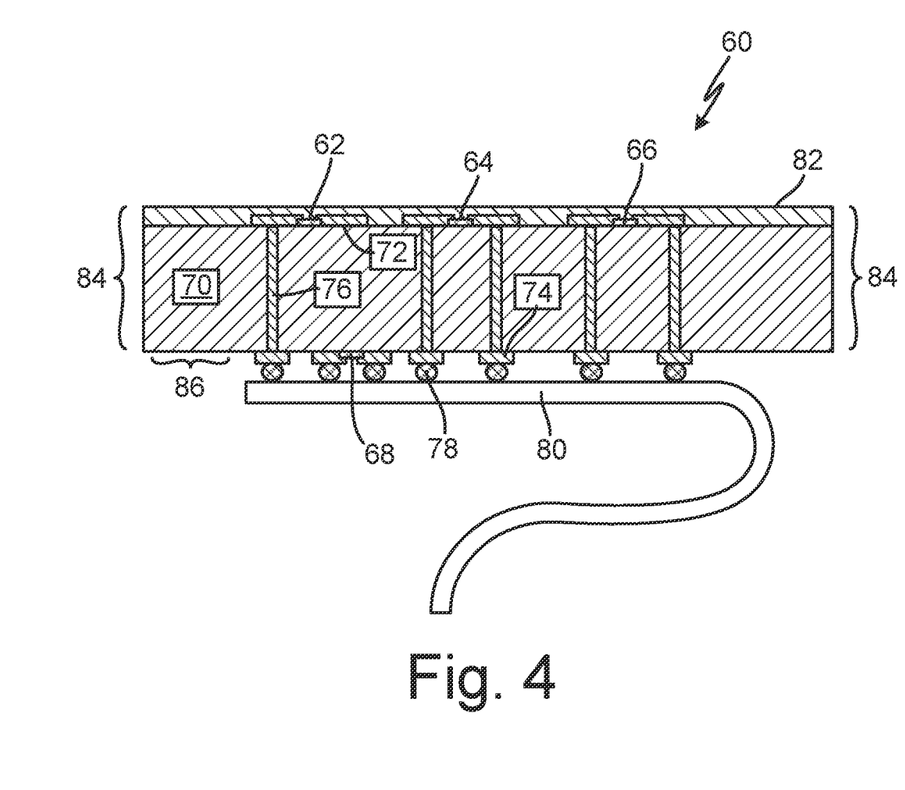
FIG. 4 is a simplified cross-sectional view of a MEMS technology implementing the temperature sensor assemblies of FIGS. 1 and 3.

FIG. 4 is a simplified cross-sectional view of a MEMS device incorporating aspects of temperature sensor assemblies 10 and 30. FIG. 4 shows MEMS device 60, including temperature sensors 62, 64, 66, and 68, substrate 70, top side electrical interconnects 72, bottom side interconnects 74, vias 76, ball grid array 78, flex circuit 80, thin film passivation layer 82, and mounting surfaces 84 and 86.

Temperature sensors 62, 64, and 66 are disposed on an outer surface of substrate 70 and configured to be positioned in a gas flow path during operation. Temperature sensors 62, 64, and 66 can be flush mounted. Temperature sensor 68 is disposed on an inner surface of substrate 70 opposite the outer surface and thereby separated from the gas flow path during operation. In some embodiments, a second substrate layer (not shown) can be incorporated to sandwich temperature sensor 68 between the outer surface (gas flow path) and a chassis as described with respect to temperature sensor assembly 40 in FIG. 3. For example, temperature sensor 68 can be disposed on a surface of a second substrate layer in manner consistent with temperature sensors 62, 64, and 66, which can be attached to the bottom of the first substrate layer. Additional electrical interconnects and vias can be provided on the second substrate.

Temperature sensors 62, 64, and 66 can be resistive temperature detectors (RTD), differential thermocouple devices, or combinations thereof, as described in U.S. Pat. No. 10,591,363, configured to generate a sensing signal indicative of a temperature.

Substrate 70 is a thermally conductive material capable of providing a heat transfer path between temperature sensors 62, 64, 66, and 68 and a chassis to which MEMS device 60 is mounted. Substrate 70 is formed of a material having a thermal conductivity and area to provide thermal resistance in heat transfer between temperature sensors 62, 64, 66, and 68 and the chassis as described with respect to temperature sensor assemblies 10, 30, and 40. The material of substrate 70 can be selected to provide a temperature gradient or temperature difference that is detectable by temperature sensors 62, 64, 66, and 68. In some embodiments, a temperature difference of at least one-tenth of a degree Celsius can be detected and is sufficient to determine the amount of sensed temperature distortion attributable to conductive heat flow through substrate 70. Accuracy can be improved by increasing the temperature gradient or difference in temperatures sensed at temperature sensors 62, 64, 66, and 68.

One or more mounting structures (not shown) as described with respect to temperature sensor assemblies 10, 30, and 40 can be configured to fasten MEMS device 60 to a chassis. Mounting surfaces 84 are configured to attach to a side wall of a chassis adjacent the gas flow path. Mounting surface 86 is configured is configured to attach to a wall of the chassis recessed from the gas flow path. Alternative embodiments may include only one of mounting surfaces 84 and 86.

Top side electrical interconnects 72, vias 76, bottom side electrical interconnects 74, ball grid array 78, flex circuit 80 connect temperature sensors 62, 64, 66, and 68 in an electrical circuit. Top and bottom side electrical interconnects 72, 74, vias 76, ball grid array 78, and flex circuit 80 can be conventional materials as known in the art and assembled according to known methods. Thin film passivation layer 82 can cover temperature sensors 62, 64, and 66 without interfering with the functioning of temperature sensors 62, 64, and 66.

MEMS device can include an electrical interface to conductively couple to electrical power and output lines. In other embodiments, MEMS device can be configured to wirelessly transmit generated output signals from temperature sensors 62, 64, 66, and 68 to an external system, such as a computing device capable of calculating gas flow stream temperatures $T_f$ from signals received by temperature sensors 62, 64, 66, 68. Such computing device can include a processor, memory, and one or more input and/or output (I/O) device interfaces that are communicatively coupled to MEMS device 60 via a wired or wireless connection. The processor can be a hardware device for executing software stored in memory. The memory can include any one or combination of memory elements such as RAM, ROM, hard drive, etc. The software can include one or more programs providing executable instructions for determining gas flow stream temperatures $T_f$ based on data received from MEMS device 10.

The configuration temperature sensors 62, 64, 66, and 68 in MEMS device 10 is provided merely as an example of a configuration that could provide multiple conductive heat transfer paths necessary for calculating gas flow stream temperatures $T_f$ from sensed temperatures. As previously disclosed, any combination of temperature sensor assemblies 10, 30, and 40 and modifications thereof, can be provided in a MEMS device. As previously disclosed, the calculation of gas flow stream temperatures $T_f$ requires at least conductive two heat transfer paths.

A MEMS device suitable for determining a gas flow stream temperature $T_f$ includes:

(a) A first heat transfer path through the substrate between a first temperature sensor and a thermally conductive structure connected to the first substrate; and (b) A second heat transfer path through the substrate between a second temperature sensor and the thermally conductive structure, the second heat transfer path being either longer or shorter than the first heat transfer path.

The MEMS device can function in conjunction with a processor to:

(c) Measure, via the first temperature sensor, a first temperature in a gas flow path;

(d) Measure, via the second temperature sensor, a second temperature; and (e) Determine, via a processor, a heat flux along each of the first and second heat transfer paths, a difference in the heat flux between the first and second heat transfer paths, and a temperature of the gas in the gas flow path based on the difference in heat flux using the equations disclosed herein.

In some embodiments, the second temperature can be a measured temperature of the gas in the gas flow path. In some embodiments, the second temperature can be measured at a location between the gas flow path and the thermally conductive structure and the MEMS device can include a third heat transfer path through the substrate between a third temperature sensor and the thermally conductive structure, the ability to measure, via the third temperature sensor, a third temperature in the gas flow path, and the ability to determine, via the processor, a heat flux for the third heat transfer path, a difference in the heat flux between the first, second, and third heat transfer paths, and a temperature of the gas in the gas flow path based on the difference in heat flux. In some embodiments, The disclosed surface mount temperature sensor assemblies offer multiple advantages over conventional gas flow temperature sensors. By taking advantage of a thermal gradient formed across a substrate, the disclosed temperature sensor assemblies can accurately measure a temperature of a gas flow stream without distorting flow in the gas flow stream.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Discussion of Possible Embodiments

The following are non-exclusive descriptions of possible embodiments of the present invention.

A temperature sensor assembly for measuring a gas temperature in a gas flow stream includes a first substrate having a first surface configured to be connected to a thermally conductive structure in a gas path, a first temperature sensor mounted to the first substrate a first distance from the first surface, and a second temperature sensor mounted to the first substrate a second distance from the first surface. The second distance is less than the first distance and the first and second temperature sensors are arranged along a temperature gradient.

The temperature sensor assembly of the preceding paragraph can optionally include, additionally and/or alternatively, any one or more of the following features, configurations and/or additional components:

A further embodiment of the foregoing temperature sensor assembly, wherein the first and second temperature sensors are resistive temperature detectors (RTD).

A further embodiment of any of the foregoing temperature sensor assemblies, wherein the first substrate is a ceramic material.

A further embodiment of any of the foregoing temperature sensor assemblies, wherein each of the first temperature sensor and second temperature sensor is disposed on an outer surface of the first substrate configured to be positioned in a gas flow path.

A further embodiment of any of the foregoing temperature sensor assemblies and further including a third temperature sensor disposed on the outer surface of the substrate. The third sensor is disposed a third distance from the first surface between the first distance and the second distance.

A further embodiment of any of the foregoing temperature sensor assemblies, wherein the first surface of the substrate is adjacent to the outer surface.

A further embodiment of any of the foregoing temperature sensor assemblies, wherein the first temperature sensor is disposed on an outer surface of the substrate configured to be positioned in a gas flow path and the second temperature sensor is disposed between the outer surface and an inner surface of the substrate opposite the outer surface. The inner surface is configured to be connected to the thermally conductive structure.

A further embodiment of any of the foregoing temperature sensor assemblies, wherein the substrate formed of a material having a lower thermal conductivity than the thermally conductive structure.

A further embodiment of any of the foregoing temperature sensor assemblies, and further including a second substrate having a second surface and an inner surface configured to be connected to the thermally conductive structure, a third temperature sensor mounted to the second substrate, and a fourth temperature sensor mounted to the second substrate. The first and third temperature sensors are disposed on an outer surface of the first and second substrate, respectively. The outer surface is opposite the inner surface and configured to be positioned in a gas flow path. The first substrate has an inner surface opposite the outer surface configured to be connected to the thermally conductive structure. The second and fourth temperature sensors are disposed between the outer surface of the first and second substrates, respectively, and the inner surface of the first and second substrate, respectively, an equal distance from the thermally conductive structure.

A further embodiment of any of the foregoing temperature sensor assemblies, wherein the second and fourth temperature sensors are disposed an equal distance from the inner surface of the first and second substrates, respectively.

A further embodiment of any of the foregoing temperature sensor assemblies, wherein the first and third temperature sensors are disposed an equal distance from the first and second surfaces, respectively.

A further embodiment of any of the foregoing temperature sensor assemblies, wherein the second substrate is formed of a material having a lower thermal conductivity than the first substrate.

A further embodiment of any of the foregoing temperature sensor assemblies, wherein the temperature sensor assembly is a MEMS device and wherein the first and second temperature sensors are thin film RTDs disposed on a surface of the first substrate.

A method of determining a temperature of a gas in a gas flow path includes providing a first heat transfer path through a first substrate between a first temperature sensor and a thermally conductive structure connected to the first substrate, providing a second heat transfer path through the substrate between a second temperature sensor and the thermally conductive structure, measuring, via the first temperature sensor, a first temperature in a gas flow path, measuring, via the second temperature sensor, a second temperature, determining, via a processor, a heat flux along each of the first and second heat transfer paths, determining, via the processor, a difference in the heat flux between the first and second heat transfer paths, and, determining, via the processor, a temperature of the gas in the gas flow path based on the difference in heat flux. A distance of the second heat transfer path is less than a distance of the first heat transfer path.

The method of the preceding paragraph can optionally include, additionally and/or alternatively, any one or more of the following features, configurations, additional components, and/or steps:

A further embodiment of any of the foregoing methods, further including transferring heat along each of the first heat transfer path and the second heat transfer path to produce a difference in temperature measured by the first temperature sensor and temperature measured by the second temperature sensor of greater than one-tenth of one degree Celsius.

A further embodiment of any of the foregoing methods, wherein the second temperature is a measured temperature of the gas in the gas flow path.

A further embodiment of any of the foregoing methods, wherein the second temperature is a temperature at a location between the gas flow path and the thermally conductive structure, and wherein the method further includes providing a third heat transfer path through the substrate between a third temperature sensor and the thermally conductive structure, measuring, via the third temperature sensor, a third temperature, determining, via the processor, a heat flux for the third heat transfer path, determining, via the processor, a difference in the heat flux between the first, second, and third heat transfer paths, and determining, via the processor, a temperature of the gas in the gas flow path based on the difference in heat flux.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A temperature sensor assembly for measuring a gas temperature in a gas flow stream, the assembly comprising:
a first substrate configured to be connected to a thermally conductive structure in a gas path, the first substrate having a first outer surface configured to be positioned in a gas flow path and a first inner surface opposite the outer surface, the first inner surface configured to be connected to the thermally conductive structure;
a first temperature sensor mounted to the first substrate a first distance from the first inner surface, the first temperature sensor disposed on the first outer surface;
a second temperature sensor mounted to the first substrate a second distance from the first inner surface, wherein the second distance is less than the first distance the second temperature sensor disposed between the first outer surface and the first inner surface;
wherein the first and second temperature sensors are arranged along a temperature gradient during use;
a second substrate having a second outer surface configured to be positioned in the gas flow path and a second inner surface configured to be connected to the thermally conductive structure;
a third temperature sensor mounted to the second substrate, the third temperature sensor disposed on the second outer surface; and
a fourth temperature sensor mounted to the second substrate, the fourth temperature sensor disposed between the second outer surface and the second inner surface;
wherein the second and fourth temperature sensors are disposed an equal distance from the first inner surface and the second inner surface, respectively.

2. The temperature sensor assembly of claim 1, wherein the first and second temperature sensors are resistive temperature detectors (RTD).

3. The temperature sensor assembly of claim 1, wherein each of the first substrate and the second substrate is a ceramic material.

4. The temperature sensor assembly of claim 1, wherein each of the first substrate and the second substrate is formed of a material having a lower thermal conductivity than the thermally conductive structure.

5. The temperature sensor of claim 1, wherein the first and third temperature sensors are disposed an equal distance from the first inner surface and the second inner surface, respectively.

6. The temperature sensor assembly of claim 1, wherein the second substrate is formed of a material having a lower thermal conductivity than the first substrate.

7. The temperature sensor assembly of claim 1, wherein the temperature sensor assembly is a MEMS device and wherein the first and second temperature sensors are thin film RTDs.

8. A method of determining a temperature of a gas in a gas flow path, the method comprising:

providing a first heat transfer path through a substrate between a first temperature sensor and a thermally conductive structure connected to the first substrate;

providing a second heat transfer path through the substrate between a second temperature sensor and the thermally conductive structure, wherein a distance of the second heat transfer path is less than a distance of the first heat transfer path;

providing a third heat transfer path through the substrate between a third temperature sensor and the thermally conductive structure;

measuring, via the first temperature sensor, a first temperature in a gas flow path;

measuring, via the second temperature sensor, a second temperature, wherein the second temperature is a temperature at a location between the gas flow path and the thermally conductive structure;

measuring, via the third temperature sensor, a third temperature;

determining, via a processor, a heat flux along each of the first, second, and third heat transfer paths;

determining, via the processor, a difference in the heat flux between the first, second, and third heat transfer paths; and determining, via the processor, a temperature of the gas in the gas flow path based on the difference in heat flux.

9. The method of claim 8, and further comprising transferring heat along each of the first heat transfer path and the second heat transfer path to produce a difference in temperature measured by the first temperature sensor and temperature measured by the second temperature sensor of greater than one-tenth of one degree Celsius.

\* \* \* \* \*